No. 788,500. PATENTED APR. 25, 1905.
N. D. CHARD.
GEARING FOR LATHE HEAD STOCKS.
APPLICATION FILED SEPT. 12, 1904.

2 SHEETS—SHEET 1.

Witnesses
Oliver B. Kaiser
Leo O'Donnell

Inventor
Nicholas D. Chard
By
Wood & Wood
Attorneys

No. 788,500. PATENTED APR. 25, 1905.
N. D. CHARD.
GEARING FOR LATHE HEAD STOCKS.
APPLICATION FILED SEPT. 12, 1904.
2 SHEETS—SHEET 2.
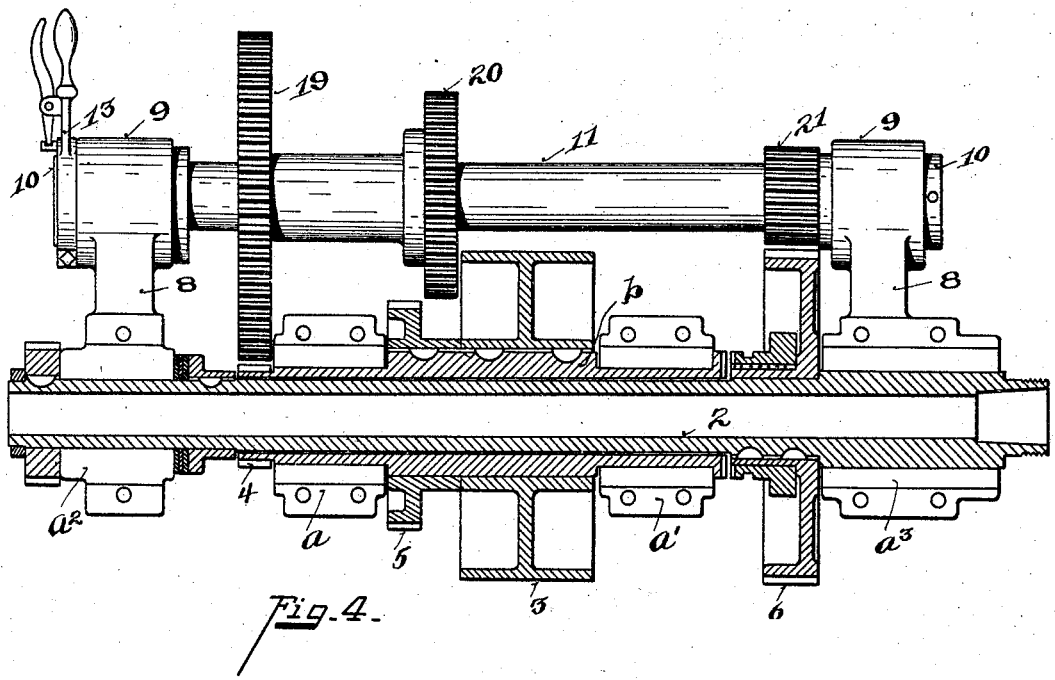

No. 788,500.

Patented April 25, 1905.

UNITED STATES PATENT OFFICE.

NICHOLAS D. CHARD, OF CINCINNATI, OHIO.

GEARING FOR LATHE HEAD-STOCKS.

SPECIFICATION forming part of Letters Patent No. 788,500, dated April 25, 1905.

Application filed September 12, 1904. Serial No. 224,076.

*To all whom it may concern:*

Be it known that I, NICHOLAS D. CHARD, a citizen of the United States, residing at Cincinnati, in the county of Hamilton and State of Ohio, have invented certain new and useful Improvements in Gearing for Lathe Head-Stocks, of which the following is a specification.

My invention relates to an improved eccentric device for bringing into operation the back gears of an engine-lathe.

The principal object of the invention is to mount two or more of the back gears upon a revolving shaft parallel with the spindle, which shaft is solidly journaled at each end in bearings, the shaft being eccentric to the bearing, and providing means for swinging this shaft bodily to and from the spindle for intermeshing back gears.

It is well known that a shaft to which gear-wheels are fixed, revolving in bearings at each end of the shaft, is a superior arrangement to journaling a sleeve upon the shaft. The arrangement of this invention permits of the constant supply of oil to the bearings at each end of the shaft, and it reduces the friction and bearing surface to a minimum.

The features of my invention are more fully set forth in the description of the accompanying drawings, forming a part of this specification, in which—

Figure 1:
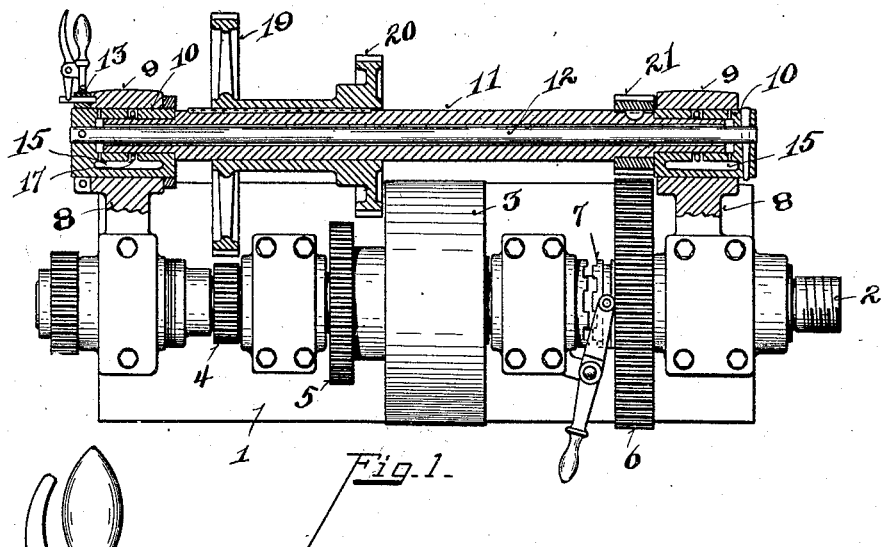
Figures 2, 3:
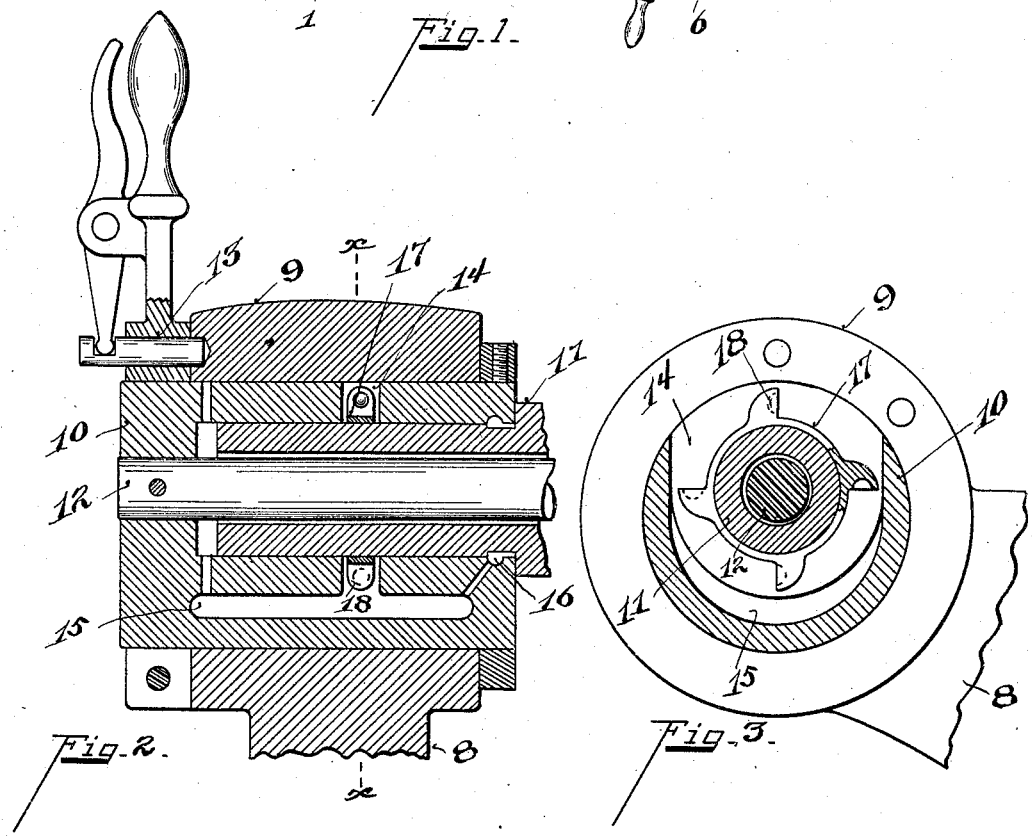

Figure 1 is a longitudinal section of my improvement with the lathe-head shown in elevation. Fig. 2 is an enlarged sectional view of the rearward portion of that shown in Fig. 1. Fig. 3 is a section on line $x\ x$, Fig. 2. Fig. 4 is a longitudinal section, partly in elevation, showing the construction of mounting the spindle and various driving and driven members.

1 represents the head-stock of an engine-lathe.

2 represents the spindle journaled in the bearings $a'\ a^2$; 3, the driving pulley-wheel; 4 5, different-diameter gear-wheels fixed to turn with the pulley-wheel. These gears 4 and 5 and driving pulley-wheels 3 are fixed upon a sleeve $b$, said sleeve being journaled in the bearings $a^3\ a^4$ and free from any engagement with the spindle 2 in their supported position other than the engagement of the parts caused by the action brought upon the clutch 7. 6 represents a gear-wheel fixed to turn with the spindle, and 7 a clutch for the direct drive between the driving-pulley and the spindle.

Projecting from each end of the head-stock from the rear are two rigid arms 8, in the upper ends of which are formed the concentric bearings 9. In each bearing is revolubly journaled a bearing-bushing 10. Each bushing 10 is provided with an eccentric end bore. 11 represents a sleeve-shaft journaled at each end in the bores of the bearing-bushing 10. Passing through sleeve-shaft 11 concentrically, but free from contact therewith, is a connecting-rod 12, pinned at each end to a bearing-bushing 10. 13 represents a lock-handle fixed to the front bearing-bushing 10 for rotating the bushing 10 in the bearings 9. The lock-handle 13 locks at different positions to the bearing 9. It will be observed that this journaling of the bushings 10 in the bearings 9 of the head-stock and eccentrically journaling the shaft 11 at each end in the bearing-bushings 10 and connecting the bearing-bushings by the rod 12, so as to unite the bearing-bushings, forms an eccentric device, whereby when the bushings 10 are rotated in the journals 9 the shaft 11 is bodily shifted to or from the spindle and the gears 4 5 concentric with the spindle. The bushings 10 are provided with the annular internal slot 14 at right angles to the shaft 11 and with the communicating oil-well 15 parallel with the shaft 11, and the oil-well 15 has the oil-supply duct 16.

The shaft 11 is provided with a ring 17, from which project the peripheral oil-cups 18, said ring and cup rotating in the annular slot 14 and dipping up oil from the oil-well 15 to keep a constant supply of oil between the bearing-surfaces of the shaft 11 and the bearing-bushings 10.

19 20 represent different-diameter gear-wheels adapted to turn with and slide on shaft 11, they being preferably formed on a common sleeve splined to shaft 11, as shown in Fig. 1. This sleeve is slidable on shaft 11, so that alternatively gear-wheel 19 may be slid opposite to gear 4 or gear 20 opposite gear 5, and when the shaft 11 is rocked toward said gears 4 5 the proper intermesh will be made. 21 represents a pinion fixed on shaft 11 and adapted to be intermeshed with the spindle-gear 6 when the shaft 11 is rocked in the proper direction. Thus it is obvious that the driving-pulley 3 may be connected to the spindle through the back gearing 4 19 21 6 or through the differently-speeded gears 5 20 21 6.

This is a simple and effective eccentric arrangement in which a revolving shaft is shifted, said shaft having solid bearings at each end.

Having described my invention, I claim—

1. In the head-stock of an engine-lathe, the combination of a driving-wheel and spindle, a gear fixed to rotate with the spindle, a gear fixed to rotate with the driving-wheel, bearings projected from the head-stock, a bearing-bushing revolubly journaled in each of said bearings, a sleeve-shaft eccentrically journaled at each end in said bearing-bushings, means within said sleeve-shaft connecting the bearing-bushings, gears on the said sleeve-shaft adapted to be intermeshed with the spindle and driving-wheel gears, and means for rotating and locking the said bearing-bushings in said head-stock bearings, substantially as described.

2. In the head-stock of an engine-lathe, the combination of a driving-wheel and spindle, a gear fixed to rotate with the spindle, a gear fixed to rotate with the driving-wheel, bearings projected from the head-stock, a bearing-bushing revolubly journaled in each of said bearings, a sleeve-shaft eccentrically journaled at each end in said bearing-bushings, a connecting-rod passing through said sleeve-shaft and uniting the bearing-bushings, gears on the said sleeve-shaft between the bearings adapted to be intermeshed with the spindle and driving-wheel gears, and means for rotating and locking the said bearing-bushings in said head-stock bearings, substantially as described.

3. In the head-stock of an engine-lathe, a driving-wheel and spindle, a gear-wheel on one of said members, and a pair of gear-wheels of different diameter on the other member, a pair of bearings in the head-stock parallel with the spindle and driving-shaft, a bearing-bushing journaled in each of said bearings, a sleeve-shaft extending between said bearings and journaled at each end eccentrically in the said bushings, a rod passed through said sleeve-shaft and connected to the said bushings, the said sleeve-shaft being splined, three gear-wheels fixed to the sleeve-shaft to rotate therewith, two of which gear-wheels slidingly engage the splined portion of the sleeve-shaft, and means for rotating the said bushings in their bearings, substantially as described.

In testimony whereof I have hereunto set my hand.

NICHOLAS D. CHARD.

Witnesses:
OLIVER B. KAISER,
LUISE BECK.